United States Patent [19]

Murase et al.

[11] 4,088,527
[45] May 9, 1978

[54] APPARATUS FOR SPLICING SHEET MATERIAL

[75] Inventors: Yoshitaka Murase, Hiratsuka; Noboru Okada, Fujisawa; Iwashiro Yoshikawa, Tokyo; Tsutomu Takeuchi, Isehara; Hisakuni Yamashita, Chigasaki, all of Japan

[73] Assignee: The Yokohama Rubber Co., Ltd., Tokyo, Japan

[21] Appl. No.: 689,017

[22] Filed: May 24, 1976

[30] Foreign Application Priority Data

Jul. 8, 1975 Japan .................................. 50-83097

[51] Int. Cl.² ............................................. B31F 5/00
[52] U.S. Cl. .................................... 156/502; 156/157; 156/304; 156/544
[58] Field of Search ............... 156/157, 158, 159, 304, 156/502, 509, 544, 266

[56] References Cited

U.S. PATENT DOCUMENTS

| | | | |
|---|---|---|---|
| 2,487,149 | 11/1949 | Leguillon | 156/502 |
| 3,166,458 | 1/1965 | Chinn et al. | 156/502 |
| 3,909,341 | 9/1975 | Moscovita | 156/582 |
| 3,933,565 | 1/1976 | Printz et al. | 156/502 |
| 3,935,056 | 1/1976 | Koyama et al. | 156/304 |
| 3,962,022 | 6/1976 | Bottasso et al. | 156/304 |

*Primary Examiner*—William A. Powell
*Attorney, Agent, or Firm*—Frank J. Jordan

[57] ABSTRACT

For joining pieces of rubberized tire cords or like sheet material end to end, a pair of coplanar tables are provided which have edges disposed opposite to each other in exact parallelism. Each table is equipped with a retractable stop for positioning a piece of sheet material thereon with its end projecting a predetermined distance beyond the said table edge, and a clamp for temporarily securing the sheet material in position on the table. As one of the tables is then moved toward the other, the pieces of sheet material have their opposed ends preliminarily joined together. The apparatus further comprises at least one finishing roller supported above the tables for rolling the preliminarily formed joint of the sheet material, which roller is in the form of a coil of wire effective both to smooth and to strengthen the joint.

7 Claims, 10 Drawing Figures

APPARATUS FOR SPLICING SHEET MATERIAL

BACKGROUND OF THE INVENTION

This invention relates to a method of, and apparatus for, splicing or joining pieces of sheet material end to end without overlap. The invention has particular utility in splicing strips of rubberized cord material used in the manufacture of vehicular tires, although the invention lends itself for use with other types of self-adhesive material in sheet form as well.

As is well known, cords surrounded by rubber for protection against abrasion are now being used extensively for production of the carcasses or foundation structures of pneumatic tires. Elongate strips of such cord material are, just after the calender coating of a rubber composition thereon, cut into short lengths either biaswise or crosswise depending upon whether they are used in bias- or radial-ply tires. These short length strips of rubberized cord material are again joined end to end to form long and continuous webs, the lateral edges of which are formed by those edges of the individual short strips which have been produced by cutting the elongate strips.

For building up such continuous webs of rubberized cord material, the usual practice is to press together the butted ends of successive short strips. Unless the ends of the successive short strips are correctly butted together, however, the joints formed by subsequent application of pressure thereto will be of uneven strength, and sometimes air may be entrapped therein. No high quality tires can be produced by use of webs having such defective joints.

SUMMARY OF THE INVENTION

It is an object of this invention to provide an improved method of splicing pieces of sheet material, particularly short strips of rubberized cord material, whereby joints can be formed which are smooth and of uniformly high strength, without any air entrapped therein.

Another object of the invention is to provide apparatus for speedily carrying out the above described method.

A further object of the invention is to provide apparatus comprising a first section for preliminarily splicing pieces of sheet material on a pair of coplanar tables, and a second section for finishing the preliminarily formed joint, while the sheet material still lies on the tables, by application of pressure, in such a manner that the joint is both smoothed and strengthened.

A further object of the invention is to provide apparatus which automatically readjusts the positions of the opposed ends of pieces of sheet material on the tables and which positively clamps them in positions thereon, so that as the tables are subsequently relatively moved toward each other, the pieces of sheet material can be correctly forced into end-to-end abutment to preliminarily form a joint.

A further object of the invention is to provide apparatus comprising a pair of finishing rollers which are mounted side by side on a common reciprocal carriage and which are adapted to roll alternately over the successively formed joints of sheet material in opposite directions, whereby the operation of the apparatus is materially expedited.

A still further object of the invention is to provide apparatus which is easy to install, which occupies little floor space, and which can be easily fully automated if desired.

According to the method of this invention, briefly stated, there are provided a pair of tables which are disposed in coplanar relationship to each other and which have edges arranged opposite to each other in exact parallelism. Pieces of sheet material to be spliced are positioned on the respective tables, with their opposed ends projecting predetermined distances beyond the said table edges, and are then clamped thereon. The tables are them moved relatively toward each other to force the clamped pieces of sheet material thereon into end-to-end abutment whereby they are preliminarily spliced. The preliminarily spliced pieces of sheet material are then unclamped, and immediately thereafter, while they still lie on the tables, pressure is applied to their joint so as to both smooth and strengthen same.

According to the apparatus of the invention, the tables are each provided with retractable stop means for positioning a piece of sheet material thereon with its end projecting a predetermined distance beyond the said table edge, and clamp means for releasably clamping the piece of sheet material in position on the table. At least one of the tables are made movable toward and away from the other for preliminarily splicing the pieces of sheet material clamped in positions thereon. For finishing the preliminarily formed joint, at least one finishing roller is provided which is adapted to roll over the joint of the sheet material resting on the tables.

Preferably, the finishing roller is in the form of a coil of wire which is generally convexed in a predetermined direction of its rolling motion along the joint of the sheet material on the tables. The roller of this construction is effective not simply to press the joint against the tables but also to urge the joined ends against each other, thereby serving the dual purpose of smoothing and strengthening the joint.

The above and various other objects, features and advantages of this invention and the manner of attaining them will become more apparent, and the invention itself will best be understood, upon consideration of the following description taken in connection with the accompanying drawings showing a specific embodiment of the invention.

DESCRIPTION OF THE PREFERRED EMBODIMENT

Figure 1:
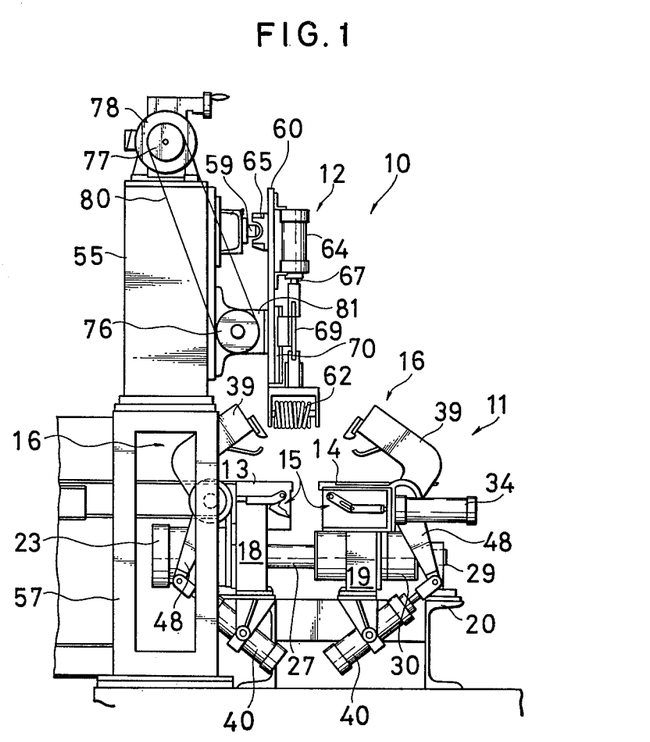
FIG. 1 is an end elevational view of splicing apparatus embodying the principles of this invention.
Figure 2:
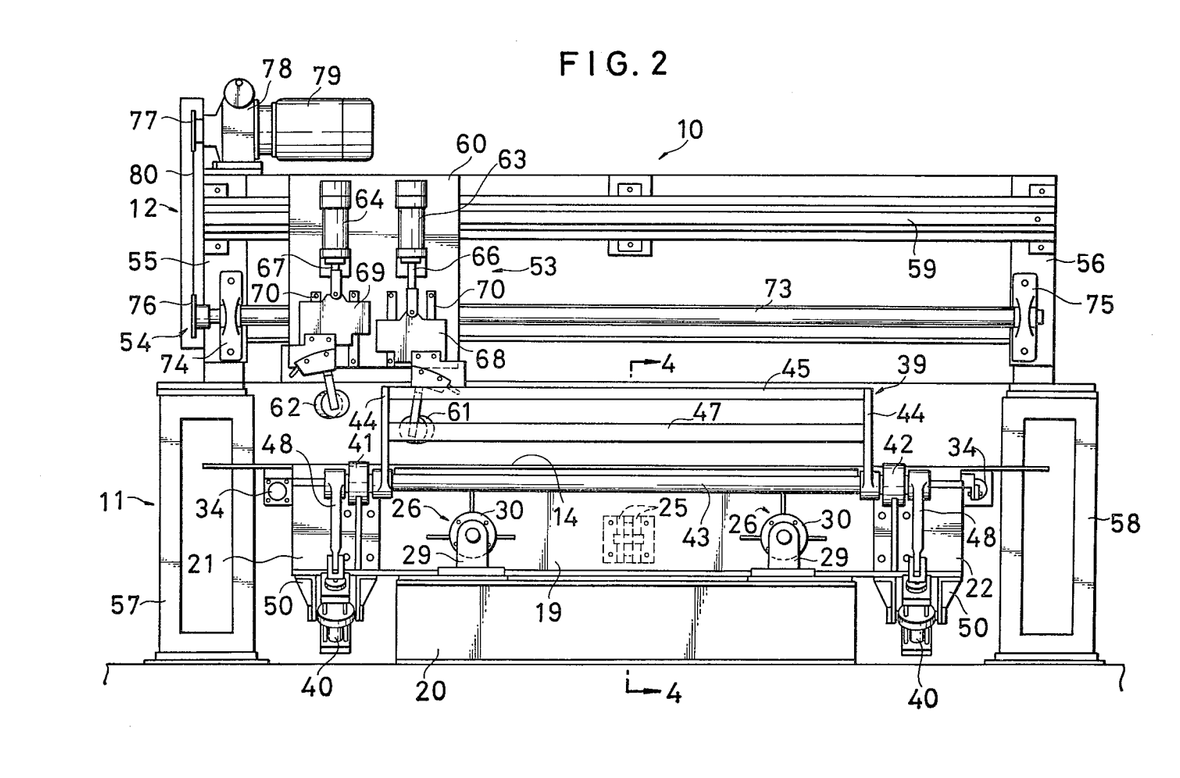
FIG. 2 is a right hand side elevational view of the apparatus of FIG. 1.

A preferred form of the apparatus according to this invention, shown in its entirety in FIGS. 1 and 2 and therein generally designated 10, is composed broadly of a preliminary splicing section 11 for splicing or butt joining pieces of rubberized cords or like self-adhesive material in sheet form on a preliminary or tentative basis, and a finishing section 12 for finishing, by application of pressure, the joint of the pieces of sheet material which has been formed by the preliminary splicing section. The constructions of the preliminary splicing section 11 and the finishing section 12, and of the constituent mechanisms or assemblies of each section, will hereinafter be described in detail under the respective headings.

PRELIMINARY SPLICING SECTION

With reference to FIGS. 1 through 4, the preliminary splicing section 11 comprises a pair of tables 13 and 14 which are adapted to hold thereon pieces of sheet material to be spliced and which are relatively movable toward and away from each other, a pair of retractable stop mechanisms 15 for positioning the pieces of sheet material on the respective tables, and a pair of clamp mechanisms 16 for releasably clamping the pieces of sheet material in positions on the respective tables.

Figure 3:
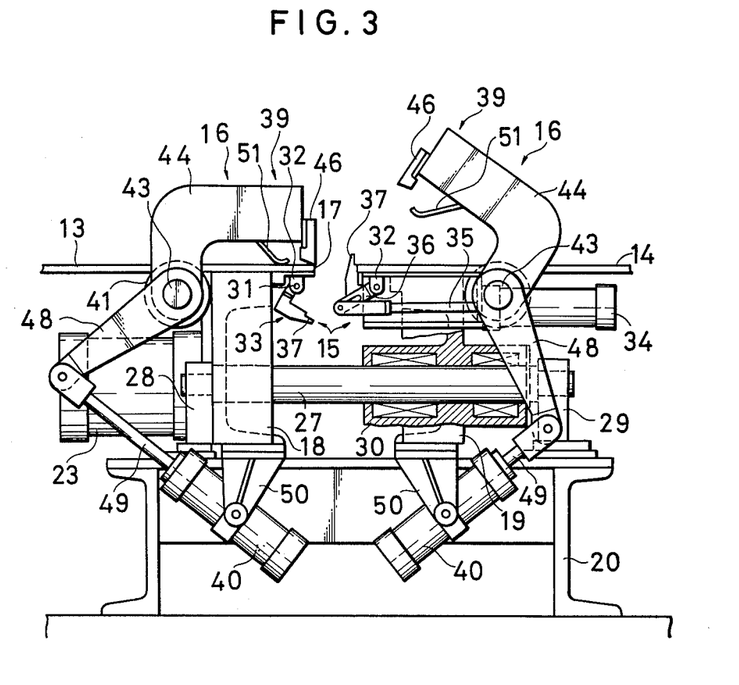
FIG. 3 is an enlarged end elevational view, partly in section and partly broken away, of the preliminarily splicing section of the apparatus of FIGS. 1 and 2.
Figure 4:
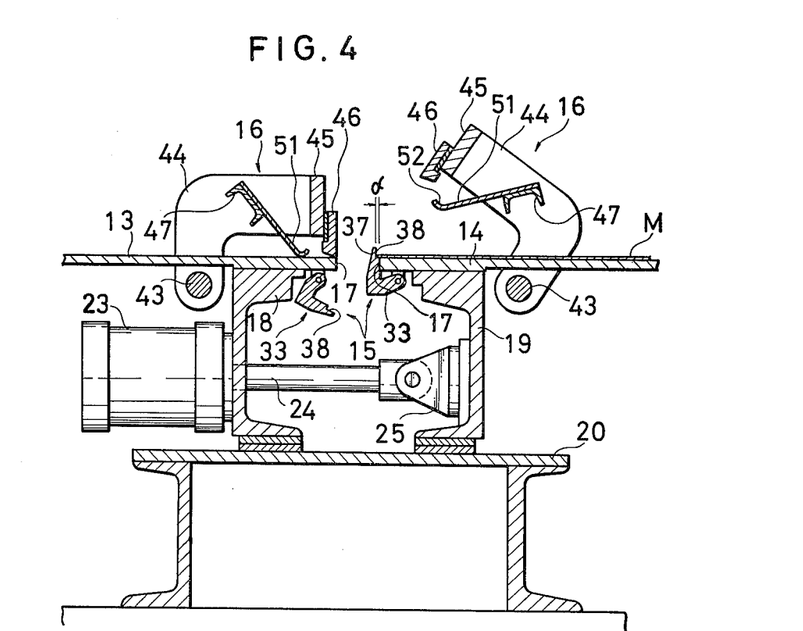
FIG. 4 is an enlarged vertical sectional view taken along the line 4—4 of FIG. 2.

As best shown in FIGS. 3 and 4, the tables 13 and 14 are disposed in coplanar relationship to each other and have opposed edges 17 arranged in exact parallelism. In this particular embodiment the table 14 is made movable toward and away from the table 13, so that the table 14 is hereinafter referred to as the movable table, and the table 13 as the stationary table. The stationary table 13 is fixedly mounted on a support 18, whereas the movable table 14 is fixedly mounted on a carriage 19.

Essentially identical in shape and size, the table support 18 and the table carriage 19 are mounted in confronting relationship on a common boxlike base structure 20. The table support 18 is of course secured to the base structure 20, and the table carriage 19 is slidably mounted thereon for movement toward and away from the table support. As will be noted from FIG. 2, each of these table support and carriage has its opposite end portions projecting beyond the extremities of the common base structure 20. Since only the table carriage 19 is seen in FIG. 2, the projecting end portions of this carriage are therein designated 21 and 22 respectively.

For moving the movable table 14 toward and away from the stationary table 13 and thus for preliminarily joining successive pieces of sheet material end to end, a fluid actuated cylinder 23 (hereinafter referred to as the splicing cylinder) is fixedly mounted on the back of the table support 18. Arranged at the midpoint of the table support 18 with respect to its horizontal or longitudinal dimension, the splicing cylinder 23 has a piston rod 24 extending with clearance through a hole in the table support and has its tip connected to a pair of brackets 25 securely mounted on the inside of the table carriage 19.

In order for the pieces of sheet material on the tables 13 and 14 to be properly joined end to end, it is necessary that the movable table 14 be moved toward the stationary table 13 with the parallel relationship of their opposed edges 17 unchanged. To this end a pair of table guide mechanisms are arranged on opposite sides of the splicing cylinder 23, as designated 26 in FIG. 2.

As illustrated in greater detail in FIG. 3, each table guide mechanism 26 includes a guide rod 27 extending horizontally through the table support 18 and the table carriage 19 in right angular relationship thereto. One end of this guide rod 27 is supported by a support block 28 fixedly mounted on the base structure 20 on the back of the table support 18, while the other end thereof is supported by a similar support block 29 fixedly mounted on the base structure on the back of the table carriage 19. The support block 29 is of course located farther away from the table carriage 19 when same is located in a predetermined position of maximum distance from the table support 18.

Also included in each table guide mechanism 26 is a thrust bearing 30 of any known or suitable construction which is shown to be formed integral with the table carriage 19 so as to permit the guide rod 27 to pas slidably therethrough. The thrust bearing 30 is of course designed to minimize frictional resistance that will be offered by the guide rod 27 as the table carriage 19 travels toward and away from the table support 18.

Retractable Stop Mechanisms

The pair of retractable stop mechanisms 15 are provided to the respective tables 13 and 14 for positioning thereon the pieces of sheet material to be spliced. As best shown in FIG. 3, each retractable stop mechanism 15 comprises a shaft 31 rotatably supported by a pair of bearings 32 (one seen) under one of the tables 13 and 14 so as to extend along its edge 17, an elongated stop member 33 of L-shaped cross section secured at one of its longitudinal edges to the rotatable shaft 31, and an actuating mechanism for pivotally moving the stop member 33 between its working and retracted positions.

To facilitate understanding, the stop member 33 for the stationary table 13 is shown in FIGS. 3 and 4 in its retracted position, and the stop member 33 for the movable table 14 is shown in its working position in the same drawings. In actual operation of the apparatus, however, the two stop members may be simultaneously moved to their working or retracted positions.

The aforesaid actuating mechanism for moving the stop member 33 for the stationary table 13 is mounted under the right hand end, as viewed in FIG. 2, of that table, whereas the actuating mechanism for the stop member 33 for the movable table 14 is mounted under the left hand end of that table. The two actuating mechanisms are exactly identical in construction, and although they are shown to be located at different ends of the tables 13 and 14 as above, this is arbitrary.

The actuating mechanism for the stop member 33 provided to the movable table 14 will therefore be described with reference to FIG. 3, it being understood that the same description applies to the other actuating mechanism. The stop actuating mechanism seen in FIG. 3 includes a fluid actuated cylinder 34 (hereinafter referred to as the stop cylinder) pivotally supported in substantially horizontal disposition under the movable table 14. The stop cylinder 34 has a piston rod 35 pivotally connected to one end of a link 36. The other end of this link is secured to the rotatable shaft 31 on which is fixedly mounted the stop member 33.

The piston rod 35 of the stop cylinder 34 seen in FIG. 3 is shown in its extended state, with the result that the stop member 33 is pivoted upwardly to its working position via the link 36 and rotatable shaft 31. In this working position the stop member 33 has its longitudinal edge 37 projecting upwardly of the movable table 14 to provide a stop fence along its edge 17.

As indicated in FIG. 4, the edge 37 of the stop member 33 is recessed at 38 throughout its length so that the piece of sheet material M may project a predetermined distance $\alpha$ beyond the edge 17 of the movable table 14 when stopped in position thereon in abutting contact with the stop member.

Upon contraction of the stop cylinder piston rod 35, the stop member 33 is pivoted downwardly to its retracted position under the movable table 14. The other stop member 33 for the stationary table 13 is shown in such a retracted position in FIGS. 3 and 4.

Clamp Mechanisms

The pair of clamp mechanisms 16 are also provided to the respective tables 13 and 14 for clamping the respective pieces of sheet material M that have been placed in positions thereon. These clamp mechanisms can also be exactly identical in construction, so that only the clamp mechanism for the movable table 14 will be described since it is more clearly seen in the drawings.

With reference to FIGS. 2 and 3, the representative clamp mechanism 16 for the movable table 14 broadly comprises a clamp proper 39 pivotally supported over the movable table, and a pair of fluid actuated cylinders 40 (hereinafter referred to as the clamping cylinders) for actuating the clamp. Referring more specifically to FIG. 2, a pair of bearings 41 and 42 are fixedly mounted on the back of the table carriage 19 at its aforesaid projecting end portions 21 and 22 respectively. A rotatable shaft 43, extending horizontally under the movable table 14, has its opposite ends journaled in the bearings 41 and 42.

Pivotally mounted on the rotatable shaft 43 is the clamp 39 which comprises a pair of horizontally spaced, L-shaped arms 44 secured each at one end to the shaft 43, a crossbeam 45 rigidly interconnecting the arms at their other or free ends, and a presser member 46 affixed to the crossbeam and depending therefrom. It will be noted from FIGS. 2 and 4 that another crossbeam 47 extends between the clamp arms 44 for reinforcing the clamp. This crossbeam 47 is employed for additional purposes hereinafter made apparent.

As in the case of the stop members 33 of the retractable stop mechanisms described previously, the clamp 39 for the movable table 14 is shown in FIGS. 3 and 4 in its retracted position, with its presser member 46 away from the table, while the other clamp for the stationary table 13 is therein shown in its working position, with its presser member in contact with the table exactly along its edge 17. These showings of FIGS. 3 and 4 are intended merely to facilitate understanding, as the two clamps 39 may be simultaneously pivoted to their working or retracted positions in the actual operation of the apparatus.

For pivotally moving the clamp 39 between the working and retracted positions, the representative clamp mechanism 16 for the movable table 14 further comprises a pair of levers 48 each secured at one end to the rotatable shaft 43 and pivotally connected at the other end to the piston rod 49 of one of the clamping cylinders 40. These clamping cylinders are pivotally supported by pairs of brackets 50 that are secured to the bottom of the table carriage 19 at its projecting end portions 21 and 22 respectively.

As best shown in FIG. 4, each clamp 39 is provided with a row of readjusting members 51 for readjusting the position of the piece of sheet material M that has been deposited on the table 13 or 14, just before the sheet material is clamped thereon. The readjusting members 51 are in the form of leaf springs arranged side by side with constant spacings therebetween and each secured at one end to the crossbeam 47 of the clamp.

The other end of each readjusting member 51 is crimped at 52 for frictional engagement with the piece of sheet material M on the table 13 or 14.

Thus, for clamping the piece of sheet material M that has been deposited on the movable table 14, for example, the pair of clamping cylinders 40 may be actuated simultaneously to cause extension of their piston rods 49. The clamp 39 is then pivoted downwardly via the levers 48 and the rotatable shaft 43. Immediately before the presser member 46 of the clamp 39 contacts the piece of sheet material M on the movable table 14, the readjusting members 51 come into frictional engagement with the sheet material. With the continued pivotal movement of the clamp 39 to its working position, the readjusting members 51 urge one end of the sheet material into close contact with the stop member 33, which is now assumed to be in its working position. The piece of sheet material M is subsequently clamped onto the movable table 14 by the presser member 46 of the clamp 39, with the said one end thereof projecting the predetermined distance $a$ beyond the edge 17 of the table.

Another piece of sheet material is to be similarly clamped in position on the stationary table 13. Then, with the stop members 33 pivoted to their retracted positions, the movable table 14 is moved toward the stationary table 13 to force the projecting ends of the pieces of sheet material thereon against each other thereby preliminarily joining them together.

FINISHING SECTION

The finishing section 12, for finishing the preliminarily formed joint of the pieces of sheet material M while they are still held, unclamped, on the tables 13 and 14, broadly comprises a finishing roller and carriage assembly, generally designated 53 in FIG. 2, that is supported above the tables for back-and-forth movement along a path parallel to their opposed edges 17, and a drive or feed mechanism 54 for thus moving the finishing roller and carriage assembly 53 along the path.

The finishing section 12 additionally comprises a pair of upright frame members 55 and 56 mounted on respective standards 57 and 58 which may be erected on the plant floor adjacent the opposite ends of the preliminary splicing section 11. A guide rail 59 extends horizontally between the upright frame members 55 and 56 to provide the aforesaid path along which the finishing roller and carriage assembly 53 is made to travel back and forth.

Finishing Roller and Carriage Assembly

As shown in FIGS. 1 and 2, the finishing roller and carriage assembly 53 comprises a carriage 60 reciprocally slidable along the guide rail 59, at least one, preferably two, finishing rollers 61 and 62 mounted on the carriage for vertical movement toward and away from the tables 13 and 14, and fluid actuated cylinders 63 and 64 (hereinafter referred to as the roller cylinders) also mounted on the carriage for urging the respective finishing rollers against, and retracting same away from, the joint of the pieces of sheet material M on the tables.

The carriage 60, which is hereinafter referred to as the roller carriage in contradistinction to the table carriage 19, is in the form of a rectangular plate disposed vertically. Formed on the back of this roller carriage is a jaw-like portion 65 slidably engaging the guide rail 59 to permit the carriage to travel back and forth therealong.

The pair of roller cylinders 63 and 64 are mounted uprightly on the roller carriage 60 in side-by-side relationship to each other. These roller cylinders have piston rods 66 and 67 extending downwardly therefrom and connected to a pair of slides 68 and 69, respectively, that are each slidable up and down along a pair of parallel spaced guide rails 70 on the roller carriage 60. The slides 68 and 69 are connected to the respective finishing rollers 61 and 62.

Figure 6:
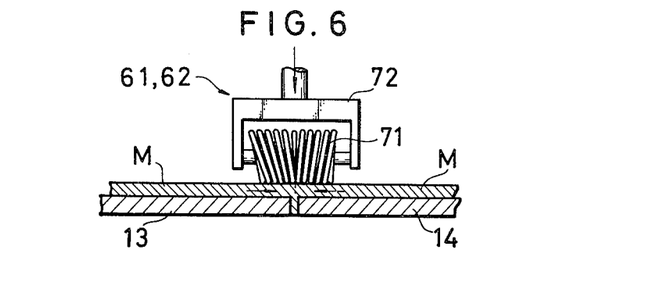
FIG. 6 is a view similar to FIG. 5 but also showing a finishing roller being rolled over the preliminarily formed joint of the sheet material on the tables for both smoothing and strengthening same.

As illustrated on an enlarged scale in FIG. 6, each of the finishing rollers 61 and 62 comprises a roller proper 71 rotatably supported by a roller frame 72. The roller proper 71 is made of a coil of wire which, when seen in a plan view, is arched with its convex side disposed in a direction of its rolling motion along the preliminarily formed joint of the pieces of sheet material M on the tables 13 and 14. The finishing roller of this construction, when rolled over the joint of the sheet material, is effective not only to exert downward pressure thereon but to urge the preliminarily joined ends against each other, so that the finishing roller serves the dual purpose of both smoothing and strengthening the joint.

It will be observed from a consideration of FIG. 2 that the right hand finishing roller 61 is convexed rightward whereas the left hand finishing roller 62 is convexed leftward. This is because the right hand finishing roller 61 is intended to roll over the joint of the sheet material only from left to right, and the left hand finishing roller 62 to roll over the subsequently formed joint from right to left, as later described in more detail.

Roller Carriage Feed Mechanism

The roller carriage feed mechanism 54 comprises an externally threaded feed rod 73 arranged parallel to the guide rail 59 and journaled at both ends in a pair of bearings 74 and 75 affixed to the upright frame members 55 and 56 respectively. One end of the feed rod 73 projects out of the bearing 74, and on this projecting end of the feed rod is fixedly mounted a driven sprocket 76. A drive sprocket 77 is connected via a speed reducer 78 to a reversible electric motor 79 mounted on the top of the frame member 55, and an endless chain 80 extends around the driven and drive sprockets 76 and 77 to transmit motor rotation to the feed rod 73.

As shown in FIG. 1, the roller carriage 60 has an internally threaded sleeve 81 formed on its back which fits over the feed rod 73, with the internal and external threads operatively interengaged. As the feed rod 73 is rotated by the motor 79 via the chain drive in the alternately reversed directions, therefore, the finishing roller and carriage assembly 53 is movable reciprocally along the guide rail 59.

OPERATION

While the operation of the apparatus according to this invention is believed to be clearly apparent from the foregoing description, further amplification will be made in the following brief summary of such operation. Prior to delivery of pieces of sheet material M to be spliced onto the tables 13 and 14, the splicing cylinder 23 may be actuated to move the movable table 14 away from the stationary table 13 to such an extent that their opposed edges 17 are sufficiently spaced from each other to permit the pair of stop members 33 to pivot to their working positions. The pair of stop cylinders 34 are then actuated to cause the stop members 33 to pivot from their retracted to working positions. The pair of clamps 39 are held standing by in their retracted positions, and the finishing roller and carriage assembly 53 is also held standing by at the left hand end of the guide rail 59 as seen in FIG. 2.

The pieces of sheet material M are then supplied onto the respective tables 13 and 14 by suitable means which fall outside the scope of this invention, in such a manner that their ends to be joined will lie more or less close to the stop members 33. In all likelihood the ends of the pieces of sheet material will not make any neat contact with the stop members 33 when they are first deposited on the tables 13 and 14.

The two pairs of clamping cylinders 40 may then be actuated simultaneously to cause the pair of clamps 30 to pivot from their retracted to working positions. Just before the clamps 39 reach their working positions, the rows of readjusting members 51 carried thereby frictionally engage the pieces of sheet material on the tables 13 and 14 and urge their opposed ends into close contact with the respective stop members 33 with the continued pivotal movement of the clamps to their working positions.

In thus readjusting the positions of the pieces of sheet material on the tables 13 and 14, the readjusting members 51 in the form of crimped leaf springs operate as follows in the case where the distance over which each row of readjusting members travels in frictional engagement with one of the pieces of sheet material is greater than the distance required for the end of that piece of sheet material to come into close contact with the stop member 33. If the pieces of sheet material are relatively rigid, the readjusting members 51 will bend by virtue of their own elasticity after the ends of the sheet material have come into contact with the respective stop members 33. If the pieces of sheet material are relatively plaint, on the other hand, then the readjusting members will cause them to bow upward between themselves and the stop members 33 after their ends have come into contact therewith. Thus, as the presser members 46 of the clamps 39 are subsequently lowered onto the pieces of sheet material, they can be positively clamped thereby with their ends projecting exactly the predetermined distances $a$ beyond the opposed edges 17 of the tables 13 and 14.

The pair of stop cylinders 34 are then actuated again to cause the stop members 33 to pivot from their working to retracted positions under the respective tables 13 and 14.

The splicing cylinder 23 is then actuated to cause contraction of its piston rod 24, with the result that the movable table 14 with its carriage 19 travels toward the stationary table 13 as guided by the pair of table guide mechanisms 26, with the opposed edges 17 of the tables maintained in exact parallelism. The projecting ends of the clamped pieces of sheet material can be preliminarily joined together as they are forcibly abutted against each other.

Figure 5:
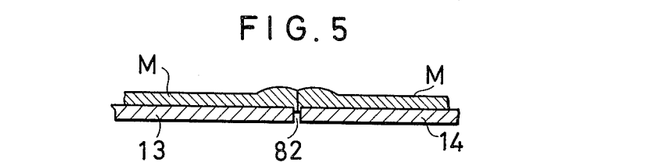
FIG. 5 is an enlarged, partial vertical sectional view showing pieces of sheet material which have been preliminarily joined end to end on a pair of tables in the apparatus of FIGS. 1 and 2.

FIG. 5 illustrates th preliminarily formed joint of the sheet material. It will be noted that the opposed edges 17 of the tables 13 and 14 are not in contact with, but are slightly spaced from, each other, and that the joined ends of the sheet material are partly caught between these opposed edges of the tables, as indicated by the numeral 82. This is desirable because, in this manner, the joint of the sheet material can be secured to the tables 13 and 14 to maintain its linearity during the subsequent finishing operation.

The two pairs of clamping cylinders 40 are then actuated again to cause the pair of clamps 39 to pivot from their working back to retracted positions and hence to unclamp the preliminarily spliced sheet material. Since the joined ends of the sheet material are partly caught between the opposed edges 17 of the tables 13 and 14 as aforesaid, the presser members 46 of the clamps 39 will readily release the sheet material, permitting same to remain in position on the tables.

With reference to FIG. 2, the roller cylinder 63 mounted on the roller carriage 60 of the finishing section 12 is then actuated to cause, via the piston rod 66 and the slide 68, the right hand finishing roller 61 to descend into contact with the joint of the sheet material on the tables 13 and 14 at its left hand end. The reversible motor 79 is then set in rotation in such a direction that the roller carriage 60 is fed rightward along the guide rail 59.

Thus, as the right hand finishing roller 61 rolls over the joint of the sheet material on the tables 13 and 14, its joined ends are not only pressed against the tables but are urged against each other, as described previously in connection with FIG. 6. The joint can therefore be smoothed and strengthened. At the end of the rightward stroke of the roller carriage 60, the roller cylinder 63 is actuated again to raise the right hand finishing roller 61 out of contact with the sheet material.

Upon completion of the finishing operation, the splicing cylinder 23 is actuated again to separate the movable table 14 from the stationary table 13 and hence to release the finished joint of the sheet material which has been partly caught between the opposed table edges 17.

One cycle of splicing operation is thus completed. The finishing roller and carriage assembly 53 is now located at the right hand end, as seen in FIG. 2, of the guide rail 59. After a preliminary joint has been formed the next time by the preliminary splicing section 11 through the above described procedure, the left hand finishing roller 62 is to be used for finishing the joint, with the roller carriage 60 fed leftward along the guide rail 59.

While a preferred form of the apparatus according to this invention has been shown and described, it is understood that the invention itself is not to be restricted by the exact constructional or operational details disclosed. For example, instead of alternately using the two finishing rollers 61 and 62 for finishing the successive joints of sheet material, there may be employed a single finishing roller, and this roller may be returned to a starting position over the tables 13 and 14 each time it completes finishing a joint. This and other modifications or variations which will readily occur to those skilled in the art are considered to fall within the scope of this invention as defined by the following claims.

What is claimed is:

1. Apparatus for joining pieces of sheet material end to end comprising, in combination:
   (a) a pair of tables disposed in coplanar relationship to each other and having edges arranged opposite to each other in parallel relationship, said tables being adapted to hold thereon the pieces of sheet material to be joined;
   (b) retractable stop means movable between a retracted and an operable stop position, said stop means in said operable stop position being spaced predetermined distances from the edges of said tables respectively;
   (c) a pair of clamps arranged over said tables respectively;
   (d) means for actuating said clamps for causing same to clamp the pieces of sheet material on said tables respectively and to release the pieces by retracting away from said tables;
   (e) readjusting means carried by said clamps, said readjusting means being operable to urge the opposed ends of the pieces of sheet material into neat contact with said retractable stop means while said clamps are being moved from said retracted to said working position such that the pieces of sheet material are thereby positioned on the tables with their opposed edges projecting said predetermined distances beyond said edges of said tables before the clamping is effected by said clamps;
   (f) means for relatively moving said tables toward and away from each other, whereby the clamped pieces of sheet material on said tables are forced into end-to-end abutment and thus preliminarily joined together when said tables are moved toward each other; and
   (g) finishing means including at least one finishing roller adapted to roll over the preliminarily formed joint of the pieces of sheet material on said tables for both smoothing and strengthening the joint.

2. The apparatus as recited in claim 1, wherein said clamps are each supported pivotally and are adapted to be pivoted by said actuating means between a working position for clamping the pieces of sheet material on said tables and a retracted position for unclamping same.

3. The apparatus as recited in claim 1, wherein said readjusting means comprises a row of leaf springs carried by each of said clamps in side-by-side relationship to each other.

4. The apparatus as recited in claim 1, wherein said means for relatively moving said tables is operable to move said tables between a retracted and an operable position in which latter position the clamped pieces of sheet material are forced into said end-to-end abutment, said tables in said operable position being spaced from one another, said opposed projecting edges of said sheet material extending at least partially into said space between said tables, thereby temporarily securing the preliminary joint to said tables to maintain linearity of the preliminary joint during the subsequent finishing operation.

5. The apparatus as recited in claim 1, wherein said finishing means comprises:
   (a) a carriage supported above said tables for movement along a path parallel to said edges of said tables;
   (b) said finishing roller being mounted on said carriage so as to be movable relative to same toward and away from said tables;
   (c) means on said carriage for urging said finishing roller against, and retracting same away from, the joint of the pieces of sheet material on said tables; and
   (d) means for moving said carriage back and forth along said path relative to said tables to permit said finishing roller to roll over the joint of the pieces of sheet material on said tables.

6. The apparatus as recited in claim 5, wherein said finishing roller includes a coil of wire which is generally convexed in a direction of its rolling motion along the joint of the pieces of sheet material on said tables.

7. The apparatus as recited in claim 6, wherein said finishing means further comprises:

(a) a second finishing roller mounted on said carriage so as to be movable relative to same toward and away from said tables, said second finishing roller being arranged in side-by-side relationship to the first mentioned finishing roller; and (b) means on said carriage for urging said second finishing roller against, and retracting same away from, the joint of the pieces of sheet material on said tables independently of said first finishing roller;

(c) said second finishing roller also including a coil of wire which is generally convexed in a direction of its rolling motion along the joint of the pieces of sheet material on said tables, said direction of the rolling motion of said second finishing roller being opposite to said direction of said rolling motion of said first finishing roller.